United States Patent
Lai et al.

(10) Patent No.: US 11,218,022 B2
(45) Date of Patent: Jan. 4, 2022

(54) POWER CONVERSION SYSTEM AND METHOD OF OPERATING THE SAME

(71) Applicant: DELTA ELECTRONICS, INC., Taoyuan (TW)

(72) Inventors: Yuan-Fang Lai, Taoyuan (TW); Chiu-Feng Wang, Taoyuan (TW); Hao-Pin Su, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/703,165

(22) Filed: Dec. 4, 2019

(65) Prior Publication Data

US 2020/0366126 A1    Nov. 19, 2020

(30) Foreign Application Priority Data

May 17, 2019  (CN) .......................... 201910414607.7

(51) Int. Cl.
*H02J 9/06* (2006.01)
*H02M 3/04* (2006.01)
*H02M 1/08* (2006.01)
*H02M 5/458* (2006.01)

(52) U.S. Cl.
CPC .............. *H02J 9/068* (2020.01); *H02J 9/062* (2013.01); *H02M 1/08* (2013.01); *H02M 3/04* (2013.01); *H02M 5/458* (2013.01)

(58) Field of Classification Search
CPC ........ H02J 9/068; H02J 9/062; H02J 2310/16; H02J 7/34; H02M 1/08; H02M 3/04; H02M 5/458; H02M 1/4225; H02M 3/156; H02M 7/162
See application file for complete search history.

(56) References Cited

U.S. PATENT DOCUMENTS

2010/0133910 A1*  6/2010  Lai .......................... H02J 9/062
                                                        307/66
2011/0215641 A1*  9/2011  Peterson ................... H02J 7/34
                                                        307/23

(Continued)

FOREIGN PATENT DOCUMENTS

TW          M-384459 U1    7/2010

OTHER PUBLICATIONS

Office Action dated Jan. 6, 2020 in TW Application No. 108117044, 9 pages.

*Primary Examiner* — John W Poos
*Assistant Examiner* — Alex W Lam
(74) *Attorney, Agent, or Firm* — Muncy, Geissler, Olds and Lowe, P.C.

(57) ABSTRACT

A power conversion system includes an uninterruptible power apparatus, a generator module, and a control unit. The uninterruptible power apparatus includes a conversion module and a DC-to-AC conversion unit. The control unit controls the conversion module and the generator module according a power command so that a first average power provided from a DC power source coupled to the conversion module is slowly increased or decreased, and the control unit controls the conversion module according to a bus voltage so that a second average power provided from a mains is slowly decreased or increased corresponding to the first average power.

20 Claims, 10 Drawing Sheets

(56) References Cited

U.S. PATENT DOCUMENTS

2013/0026836 A1\* 1/2013 Dighrasker ............. H02J 9/062
307/66
2014/0297051 A1\* 10/2014 Zhang ................... G05B 15/02
700/287

\* cited by examiner

POWER CONVERSION SYSTEM AND METHOD OF OPERATING THE SAME

BACKGROUND

Technical Field

The present disclosure relates to a power conversion system and a method of operating the same, and more particularly to a power conversion system and a method of operating the same with smooth and proportional load transfer.

Description of Related Art

The statements in this section merely provide background information related to the present disclosure and do not necessarily constitute prior art.

Since demands of servers or large data centers have grown, and higher reliability, faster deployment, higher power density are required to maintain operational stability of the servers or the large data centers. Therefore, the demand of power train units (PTUs) are increasingly being taken seriously.

The conventional power conversion system usually has a monitoring system, which integrates all power system equipment into a single cabinet. The monitoring system includes a power distribution system, an air conditioner, an automatic transfer switch (ATS), an uninterruptible power system (UPS), a battery, wirings, a communication monitoring, and so on. Because the monitoring system is equipped with the uninterruptible power system, the power conversion system is highly reliable.

The traditional power conversion system selectively connects the mains or generator as the AC input power through the automatic transfer switch. When the mains is interrupted, the automatic transfer switch is directly switched to the generator to supply power, which would cause a surge current since the generator instantaneously loads, and the surge current is likely to cause the generator to malfunction and shut down. Therefore, the generator capacity is designed to have at least 1.7 times of the load capacity, but which causes a significant increase in equipment costs. Also, the generator is an important input source after the interruption of the mains, and therefore the regular maintenance is required to ensure system reliability. Due to the design of the automatic transfer switch, an off-line test is generally selected and a generator load bank must be added. Therefore, it is necessary to additionally increase the cost of the generator load bank and increase the wiring time when the generator load bank is coupled to the generator.

If the function test of the generator is performed, the load would be converted at one time, and the surge current will easily cause the generator to malfunction and shut down and the mains must be immediately switched back to supply power. Due to the slow switching speed of the automatic transfer switch, the battery may be additionally discharged during the switching process, and therefore the battery backup time would be reduced. During the peak of power usage, the uninterruptible power system with the automatic transfer switch fails to transfer part of the loads to the generator. In addition, the risk of a single point failure of the automatic transfer switch is high, and therefore if the automatic transfer switch is in fault, the uninterruptible power system would lose input power and cause the output of the uninterruptible power system to be interrupted.

SUMMARY

The present disclosure provides a power conversion system to solve the above-mentioned problems. The power conversion system supplies power to a load. The power conversion system includes a conversion module and a DC-to-AC conversion unit. The conversion module is coupled to a mains and a DC power source, and converts the mains and the DC power source into a bus voltage. The DC-to-AC conversion unit is coupled to the conversion module, and converts the bus voltage to supply power to the load. The generator module is coupled to the DC power source. The control unit is coupled to the conversion module. The control unit controls the conversion module according to a power command so that a first average power provided from the DC power source is slowly increased or decreased, and the control unit controls the conversion module according to the bus voltage so that a second average power provided from the mains is slowly decreased or increased corresponding to the first average power.

The present disclosure provides a method of operating a power conversion system to solve the above-mentioned problems. The method includes the steps of: controlling a conversion module to convert a mains and a DC power source into a bus voltage, controlling a DC-to-AC conversion unit to convert the bus voltage to supply power to a load, controlling a generator module to provide electricity energy to the DC power source, controlling a first average power provided from the DC power source to slowly increase or decrease according to a power command, and controlling a second average power provided from the mains to slowly decrease or increase corresponding to the first average power according to the bus voltage.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
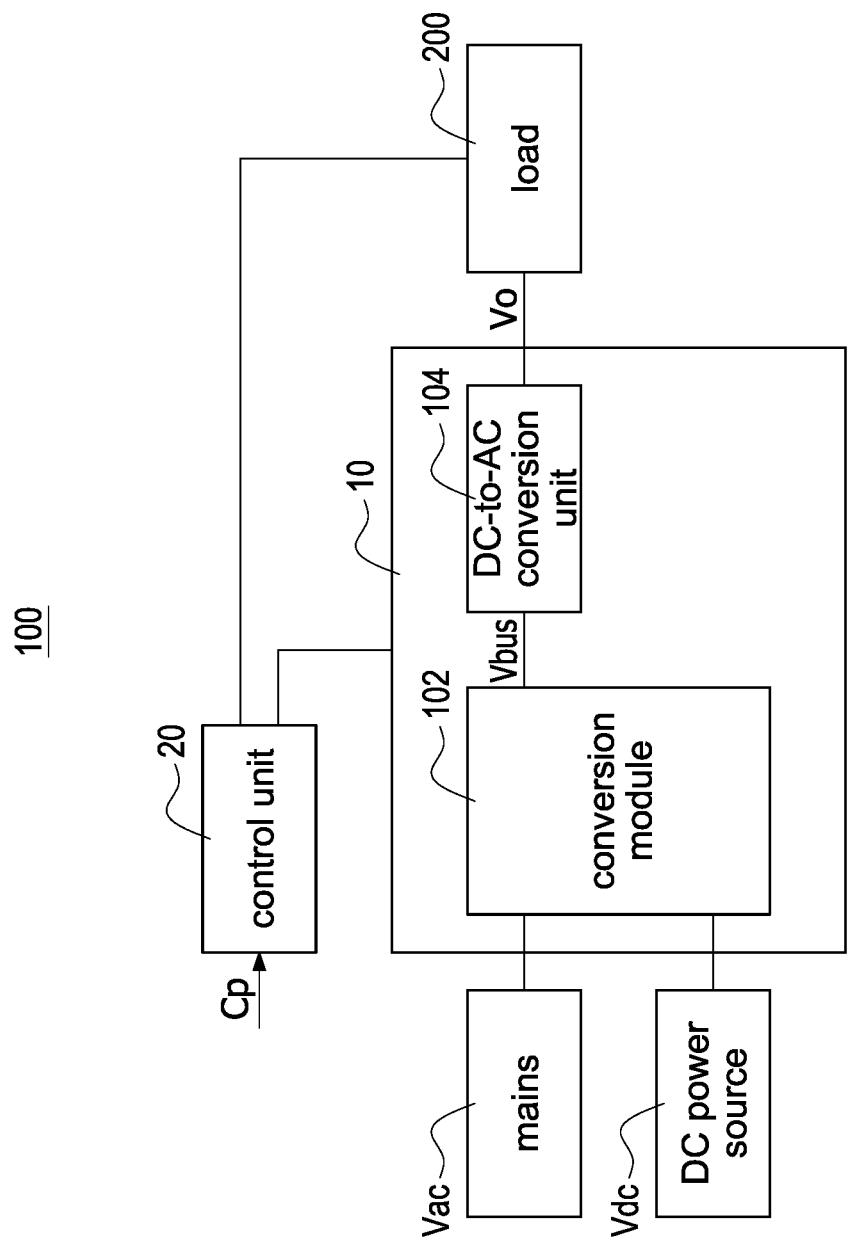
FIG. 1 is a schematic block diagram of a power conversion system according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a schematic block diagram of a power conversion system according to the present disclosure. The power conversion system 100 receives a mains Vac and a DC power source Vdc, and converts the mains Vac and the DC power source Vdc into an output power source Vo to supply power to a load 200. The power conversion system 100 includes an uninterruptible power apparatus 10 and a control unit 20. The uninterruptible power apparatus 10 receives the mains Vac and the DC power source Vdc, and is coupled to the load 200. The control unit 20 is coupled to the uninterruptible power apparatus 10, and controls the uninterruptible power apparatus 10 to convert the mains Vac or the DC power source Vdc into the output power source Vo. The uninterruptible power apparatus 10 includes a conversion module 102 and a DC-to-AC conversion unit 104. The conversion module 102 is coupled to the mains Vac, the DC power source Vdc, and the control unit 20. The control unit 20 controls the conversion module 102 to convert the mains Vac or the DC power source Vdc into a bus voltage Vbus. The DC-to-AC conversion unit 104 is coupled to the conversion module 102 and the load 200, and converts the bus voltage Vbus into the output voltage (output power source Vo). In particular, the position of the control unit 20 is not limited to the outside or inside of the uninterruptible power apparatus 10 as long as the control purpose can be achieved. When the control unit 20 wants to adjust a ratio of supplying power to the load (hereinafter referred to as "load ratio") between the mains Vac and the DC power source Vdc, the control unit 20 slowly adjusts the load ratio supplied by the DC power source Vdc (for example but not limited from 0% to 50%) through the conversion module 102. Afterward, according to the load ratio supplied by the DC power source Vdc, the control unit 20 reversely and slowly adjust the load ratio supplied by the mains Vac (for example but not limited from 100% to 50%). Specifically, the control unit 20 controls the conversion module 102 according to the power command Cp so that the conversion module 102 slowly increases or decreases a first average power provided from the DC power source Vdc, and therefore slowly adjusts the load ratio supplied by the DC power source Vdc. The power command Cp may be provided by an external apparatus such as but not limited to a remote control device, or provided according to actual operation conditions, such as the load 200, the mains Vac, or the DC power source Vdc through detecting the power conversion system 100 by the control unit 20.

When the first average power is slowly adjusted, the bus voltage Vbus would be theoretically varied due to the adjustment of the first average power. However, the control unit 20 would correspondingly control the conversion module 102 according to the bus voltage Vbus so that the conversion module 102 slowly adjusts the second average power (i.e., adjusts reversely the first average power) corresponding the mains Vac. Therefore, when the load ratio supplied by the DC power source Vdc is slowly increased or decreased, the load ratio supplied by the mains Vac is correspondingly slowly decreased or increased.

Further, since a smooth switching technology with slow adjustment is utilized when the load transfers between the mains Vac and the DC power source Vdc in the power conversion system 100, no additional automatic transfer switch coupled in front of the uninterruptible power apparatus 10 is required. Therefore, the uninterruptible power apparatus 10 can avoid generating the surge current when the automatic transfer switch is switched. Also, the smooth switching technology with slow adjustment can be performed relatively easily and accurately (for example but not limited to, accurately distributing the mains Vac to 48% and the DC power source Vdc 52%).

Figure 2A:
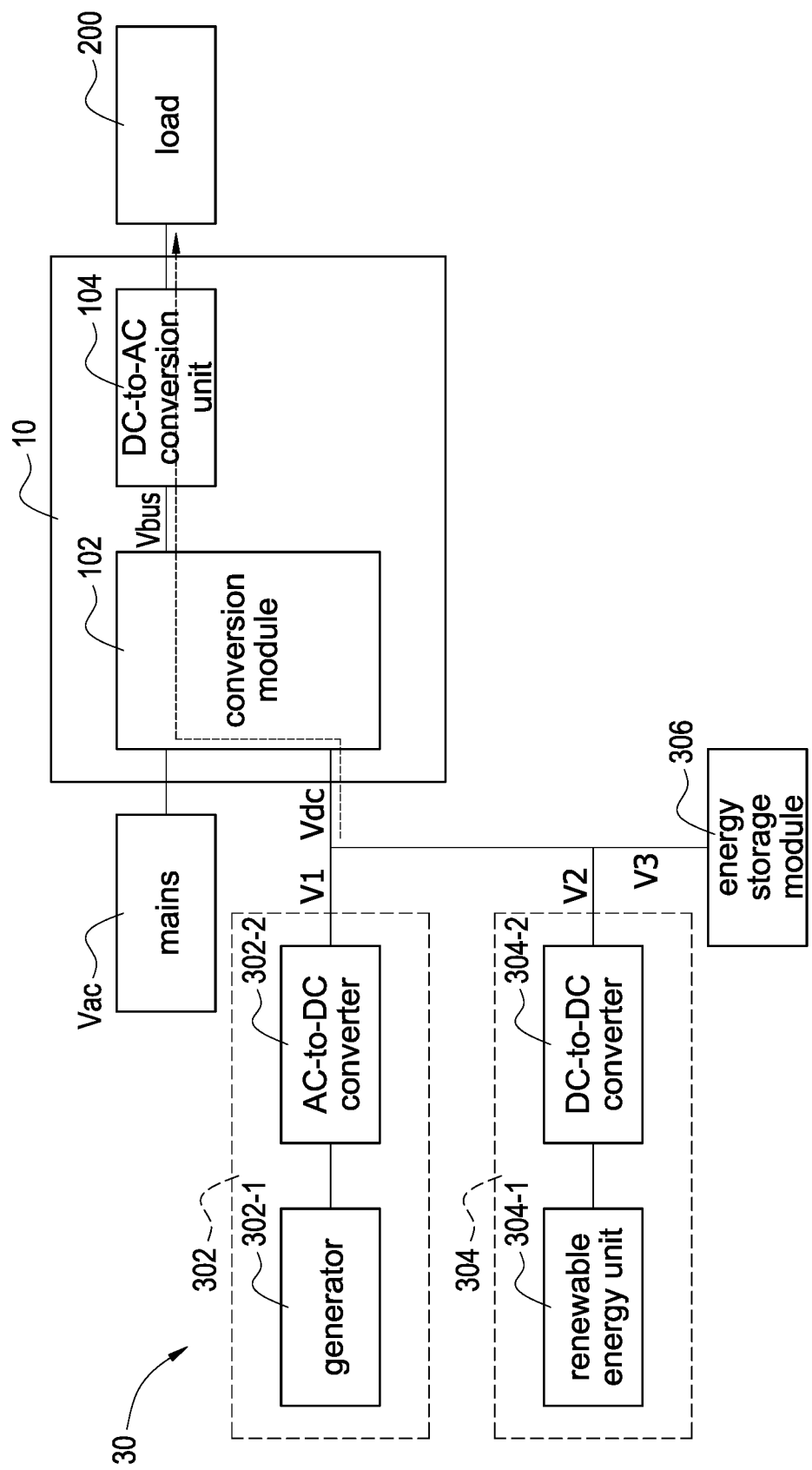
FIG. 2A is a schematic diagram of power transmission according to a first embodiment of the power conversion system of the present disclosure.
Figure 2B:
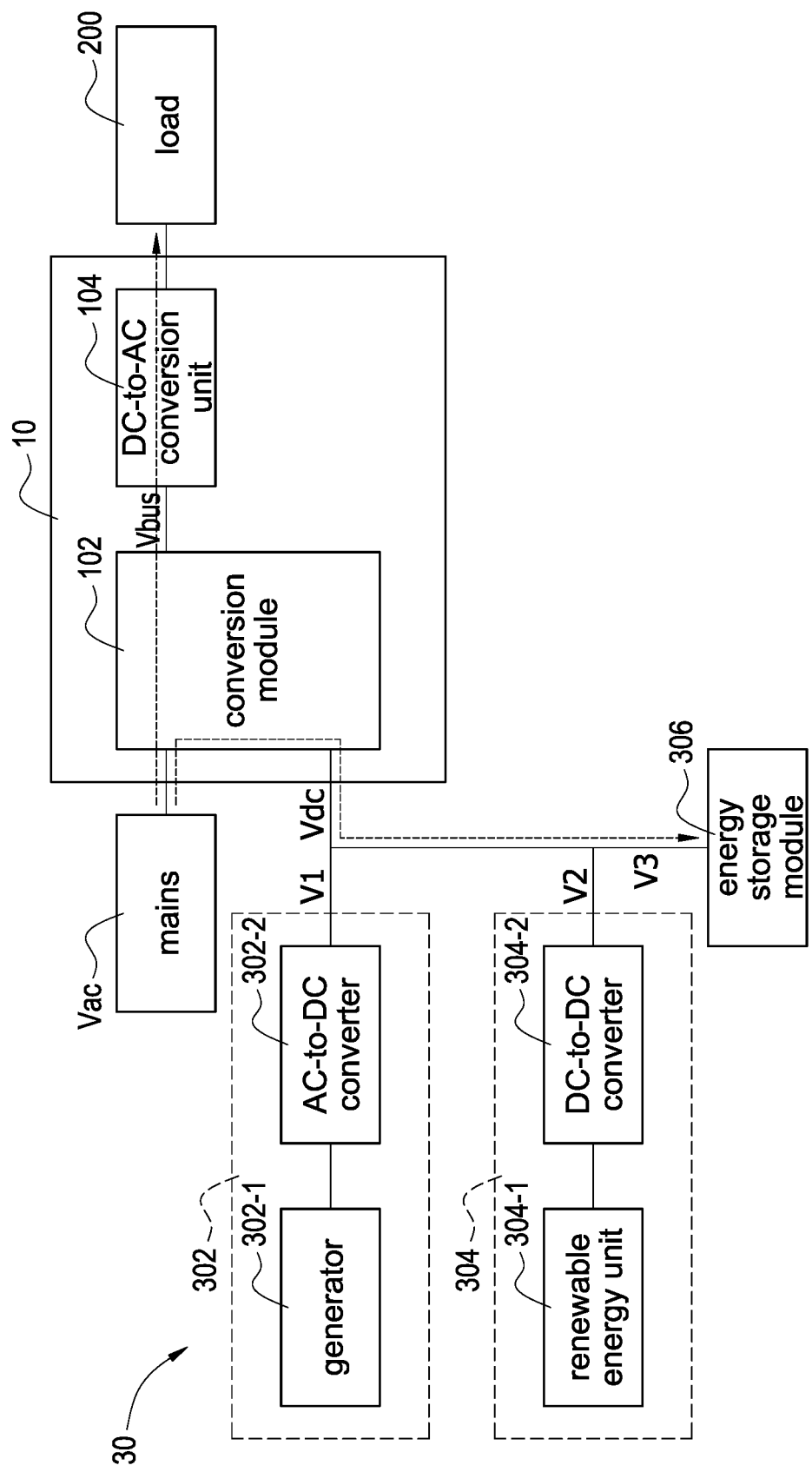
FIG. 2B is a schematic diagram of power transmission according to a second embodiment of the power conversion system of the present disclosure.
Figure 2C:
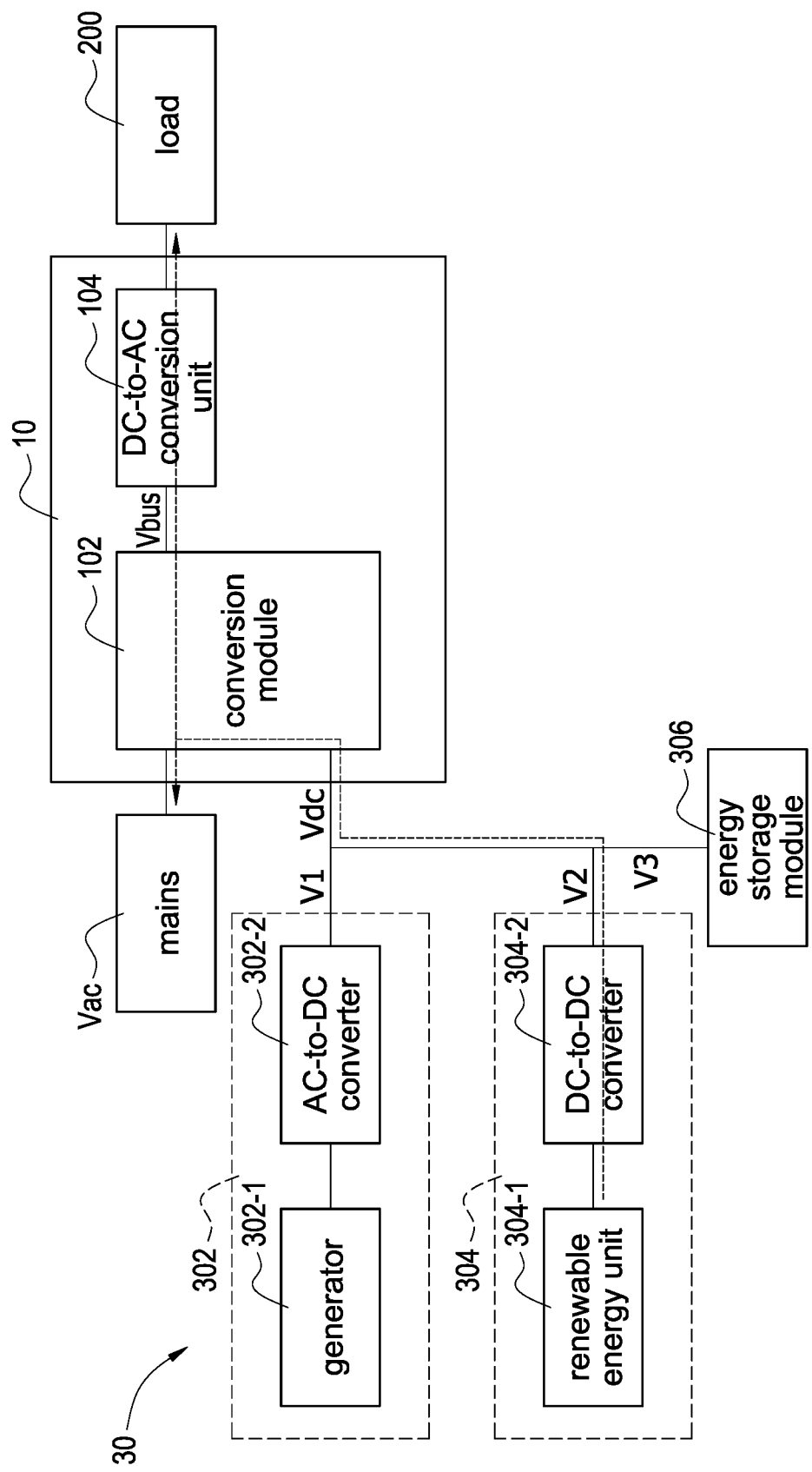
FIG. 2C is a schematic diagram of power transmission according to a third embodiment of the power conversion system of the present disclosure.
Figure 3A:
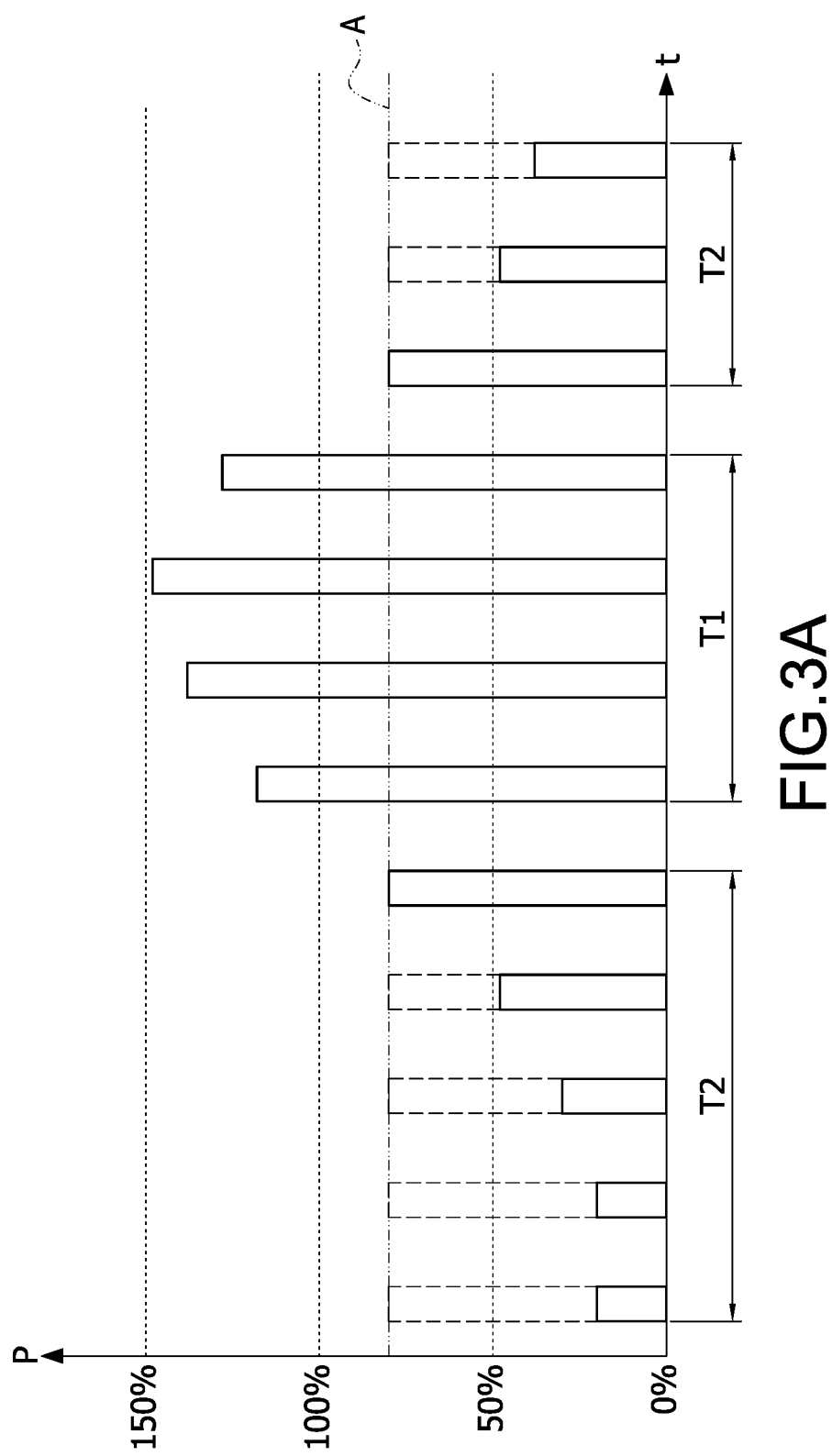
FIG. 3A is a schematic diagram of power consumption according to a first embodiment of the power conversion system of the present disclosure.
Figure 3B:
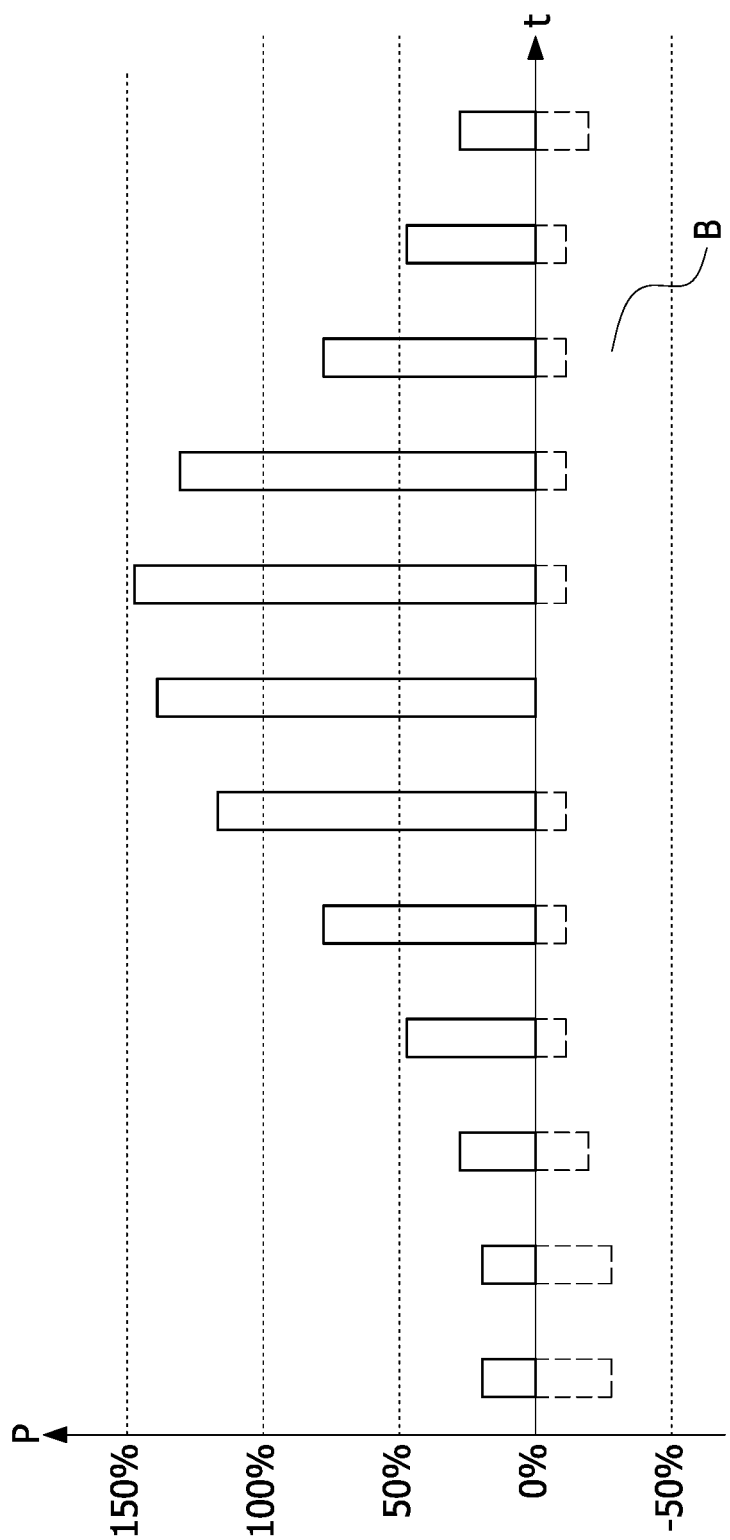
FIG. 3B is a schematic diagram of power consumption according to a second embodiment of the power conversion system of the present disclosure.

Please refer to FIG. 2A through FIG. 2C, which show schematic diagrams of power transmission according to different embodiments of the power conversion system of the present disclosure, refer to FIG. 3A and FIG. 3B, which show schematic diagrams of power consumption according to different embodiments of the power conversion system of the present disclosure, and also refer to FIG. 1. The power conversion system 100 further includes a DC power supplying module 30. The DC power supplying module 30 is coupled to the conversion module 102, and provides the DC power source Vdc to the conversion module 102. The DC power supplying module 30 includes generator module 302, a renewable energy module 304, and an energy storage module 306. The generator module 302 includes a generator 302-1 and an AC-to-DC converter 302-2. The AC-to-DC converter 302-2 may be a rectifying circuit for converting electric energy generated from the generator 302-1 into a first power source V1, and providing the first power source V1 to the conversion module 102. The renewable energy module 304 includes a renewable energy unit 304-1 and a DC-to-DC converter 304-2. The DC-to-DC converter 304-2 converts electric energy generated from the renewable energy unit 304-1 into a second power source V2, and provides the second power source V2 to the conversion module 102. The energy storage module 306 is, for example but not limited to, a battery pack for providing a third power source V3 to the conversion module 102. In particular, a generator of the conventional power conversion system is installed at the input end of the AC power source, however, the generator module 302 of the present disclosure is used to provide the DC power source Vdc to solve the above-mentioned problems.

Please refer to FIG. 2A and FIG. 3A. When the demand power is greater than or equal to a predetermined power A, the control unit 20 controls the mains Vac and the DC power source Vdc jointly supply power to the load 200 according to the power command Cp. For example, the predetermined power A may be a breakpoint of calculating power consumption range. When the demand power is too high and to make the power supplied from the mains Vac be greater than the predetermined power A, the extra electricity consumption must be paid for a relatively high cost. On the contrary, when the demand power is low to make the power supplied from the mains Vac be less than the predetermined power A, a relatively low cost for lower power usage.

As shown in FIG. 3A and FIG. 3B, the vertical axis represents power P and the horizontal axis represents time t. During the peak period of electricity consumption T1 (shown in FIG. 3A), the demand power of the load 200 is greater than or equal to the predetermined power A. At this condition, the control unit 20 controls the conversion module 102 to converter the DC power source Vdc provided from the generator module 302, the renewable energy module 304, or the energy storage module 306 to slowly increase the load ratio supplied by the DC power source Vdc and slowly decrease the load ratio supplied by the mains Vac. For example but not limited to, the energy storage module 306 and the renewable energy module 304 jointly supply the DC power source Vdc or the energy storage module 306 individually supply the DC power source Vdc. Therefore, the mains Vac and the DC power source Vdc jointly supply power to the load 200 during the peak period of electricity consumption T1 to reach the effect of saving peak energy. Moreover, if the generator 302-1 is in the functional test, no additional generator load bank is required. The control unit 20 can directly control the conversion module 102 to transfer the load ratio and therefor to online complete the functional test of the generator 302-1, thereby significantly reducing the costs of system construction due to no additional generator load bank.

Please refer to FIG. 2B and FIG. 3A. When the demand power is less than the predetermined power A, the control unit 20 controls the conversion module 102 to make the mains Vac supply power to the load 200, and controls the conversion module 102 to make the mains Vac charge the energy storage module 306. During the electricity off-peak period T2 shown in FIG. 3A, the demand power of the load 200 is less than the predetermined power A. At this condition, the control unit 20 controls the conversion module 102 to make the mains Vac supply power to the load 200 as well as controls the conversion module 102 to charge the energy storage module 306 in which the mains Vac is lower than the limit of the predetermined power A (indicated by the dotted lines).

Please refer to FIG. 2C and FIG. 3B. The conversion module 102 may be a bi-directional conversion module. The control unit 20 controls the conversion module 102 to make the DC power source Vdc be converted into the mains Vac through the bi-directional conversion module, and to make the mains Vac be fed back to a power company (not shown). As shown in FIG. 3B, more than 0% of the electricity power is the required demand power of the load 200, and less than 0% of the electricity power is the additional redundant power B generated by the renewable energy module 304 expressed in dotted lines. When the renewable energy module 304 supplies power to the load 200 and the redundant power B is available, the control unit 20 controls the conversion module 102 to make the redundant power B be converted into the mains Vac through the bi-directional conversion module, and to make the mains Vac be fed back to the power company as shown in FIG. 2C. Since the power generation of the renewable energy module 304 is not stable, the redundant power B can be stored in the energy storage module 306 and further be converted into the mains Vac by the bi-directional conversion module and fed back to the power company (not shown) if the redundant power B (shown in FIG. 3B) is available after the renewable energy module 304 supplies power to the load 200. Therefore, the additional redundant power B can be purchased by the power company to effectively achieve economic benefits.

Figure 4A:
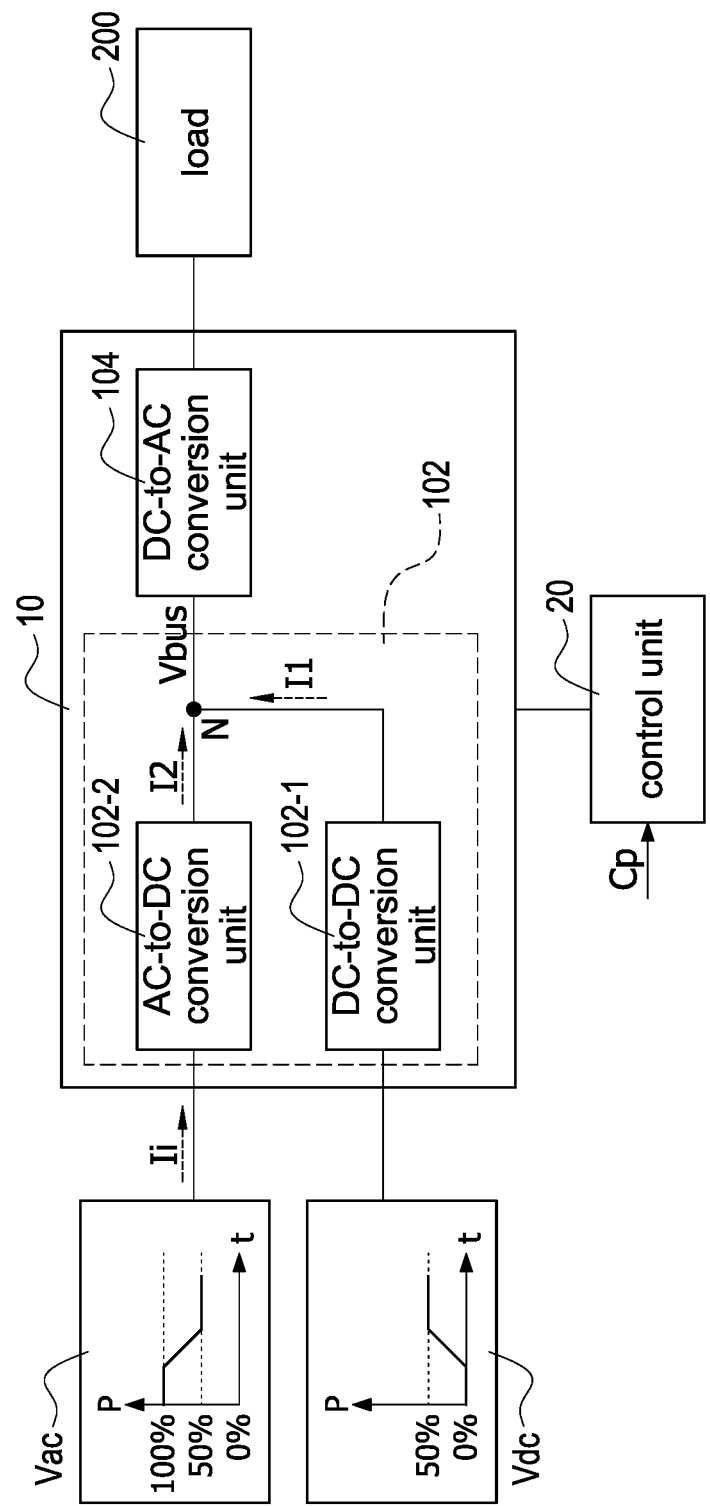
FIG. 4A is a schematic circuit block diagram according to a first embodiment of a conversion module of the present disclosure.

Please refer to FIG. 4A, which shows a schematic circuit block diagram according to a first embodiment of a conversion module of the present disclosure, and also refer to FIG. 1 to FIG. 4A. The conversion module 102 includes a DC-to-DC conversion unit 102-1 and an AC-to-DC conversion unit 102-2. The DC-to-DC conversion unit 102-1 is coupled to the DC power source Vdc and the DC-to-AC conversion unit 104. The AC-to-DC conversion unit 102-2 is coupled to the mains Vac and the DC-to-AC conversion unit 104. The DC-to-DC conversion unit 102-1 converts the DC power source Vdc into the bus voltage Vbus, and provides a first current I1 to a node N according to the required demand power of the load 200 and the control operation of the control unit 20. Therefore, the first average power provided by the DC power source Vdc corresponds to the first current I1 outputted from the DC-to-DC conversion unit 102-1 according to the identical relationship between the input power and the output power (i.e., the conversion losses is ignored). The AC-to-DC conversion unit 102-2 converts the mains Vac into the bus voltage Vbus, and provides a second current I2 to the node N according to the required demand power of the load 200 and the control operation of the control unit 20. Therefore, the second average power provided by the mains Vac corresponds to an input current Ii and a second current I2 of the AC-to-DC conversion unit 102-2 according to the identical relationship between the input power and the output power (i.e., the conversion losses is ignored). When the second current I2 is varied, the second average power is also varied as the variation of the second current I2.

When the control unit 20 wants to increase the load ratio supplied by the DC power source Vdc (for example but not limited from 0% to 50%), the control unit 20 slowly increases the first current I1 provided from the DC-to-DC conversion unit 102-1 according to the power command Cp so that the first average power is correspondingly increased. The DC-to-DC conversion unit 102-1 is controlled by adjusting the first duty cycle that is similar to operating the DC-to-DC conversion unit 102-1 in a current mode. When the first current I1 is varied, the bus voltage Vbus would be theoretically varied due to the increase of the first current I1. However, the control unit 20 would control the AC-to-DC conversion unit 102-2 to maintain the bus voltage Vbus on the node N to be a predetermined output voltage Vp so as to adjust the second current I2 outputted from the AC-to-DC conversion unit 102-2. Therefore, when the first current I1 is slowly increased, the control unit 20 adjusts the second duty cycle according to the variation of the bus voltage Vbus so that the second current I2 outputted from the AC-to-DC conversion unit 102-2 is slowly decreased, and therefore the second average power is correspondingly slowly decreased and the load ratio supplied by the mains Vac (for example but not limited from 100% to 50%). In particular, the control unit 20 wants to decrease the load ratio supplied by the DC power source Vdc that is just contrary to the above-mentioned increase operation, and the detail description is omitted here for conciseness.

Figure 4B:
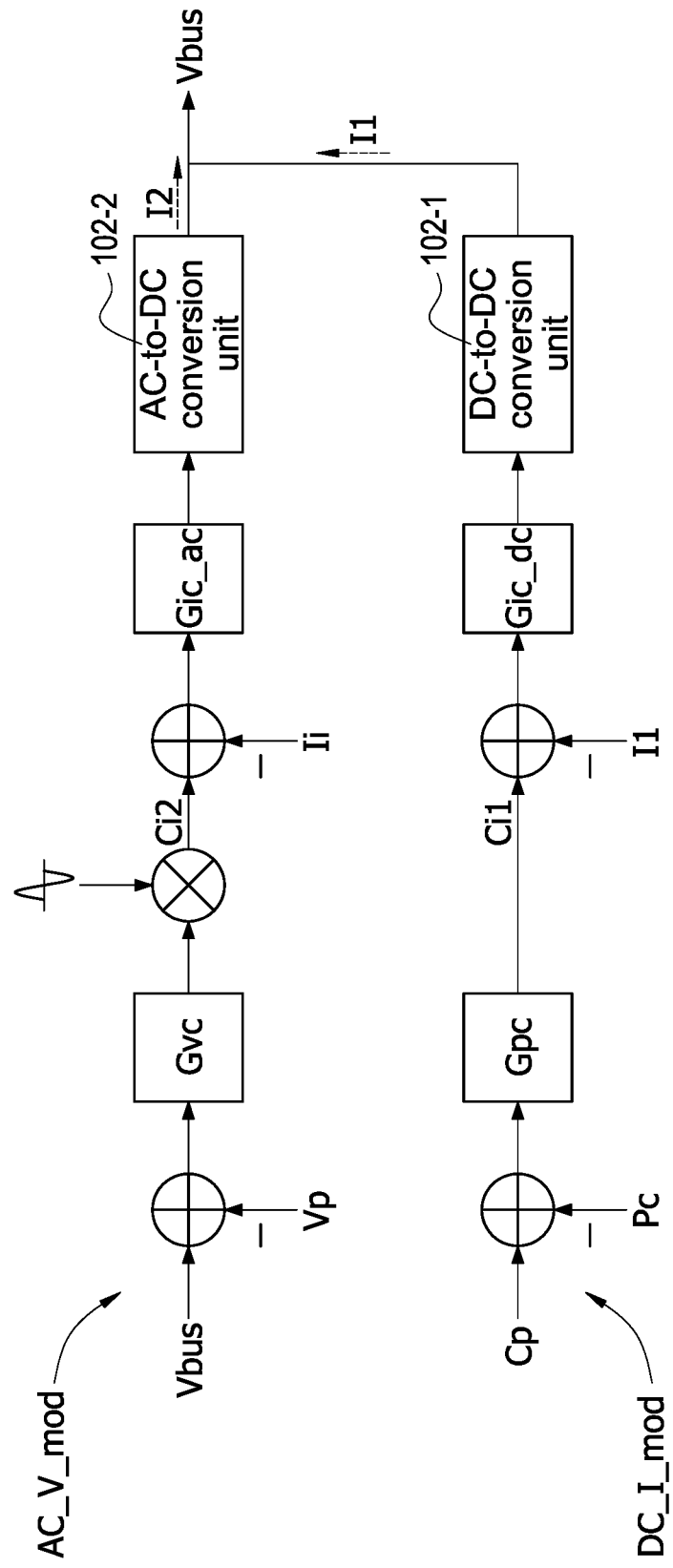
FIG. 4B is a schematic control block diagram according to the first embodiment of the conversion module of the present disclosure.

Please refer to FIG. 4B, which shows a schematic control block diagram according to the first embodiment of the conversion module of the present disclosure, and also refer to FIG. 1 to FIG. 4A. As shown in FIG. 4B, the control operation of the DC-to-DC conversion unit 102-1 is a current mode DCI mod. In the current mode DCI mod, the control unit 20 acquires a power difference value by a subtraction operation between the power command Cp and a current power value Pc of the DC-to-DC conversion unit 102-1. The power difference value is multiplied and calculated by a control parameter Gpc to acquire a (DC) first current command Ci1. A first current difference value is acquired by a subtraction operation between the first current command Ci1 and the first current I1 outputted from the DC-to-DC conversion unit 102-1, and the first current difference value is multiplied by a control parameter Gic_dc to acquire a first control amount. The control unit 20 adjusts the first duty cycle of the DC-to-DC conversion unit 102-1 according to the first control amount to adjust the first current I1 outputted from the DC-to-DC conversion unit 102-1.

Please refer to FIG. 4B again, the control operation of the AC-to-DC conversion unit 102-2 is a voltage mode AC_V_mod. When the first current I1 is adjusted, the bus voltage Vbus would be varied. The control unit 20 acquires a voltage difference value by a subtraction operation between the bus voltage Vbus and the predetermined output voltage Vp of the AC-to-DC conversion unit 102-2. The voltage difference value is multiplied with a sinusoidal wave (the mains Vac is a sinusoidal wave) to acquire a (AC) second current command Ci2. A second current difference value is acquired by a subtraction operation between the second current command Ci2 and the input current Ii inputted to the AC-to-DC conversion unit 102-2, and the second current difference value is multiplied by a control parameter Gic_ac to acquire a second control amount. The control unit 20 adjusts the second duty cycle of the AC-to-DC conversion unit 102-2 according to the second control amount to control the input current Ii of the AC-to-DC conversion unit 102-2 to adjust the second current I2 outputted from the AC-to-DC conversion unit 102-2. Since the voltage difference value is multiplied with a sinusoidal wave (the mains Vac is a sinusoidal wave) to acquire a (AC) second current command Ci2, the AC-to-DC conversion unit 102-2 has a function of the power factor correction so that the input current Ii follows the mains Vac. In particular, since the AC current would constantly vary, the present disclosure discusses the concept of average power. For example, the slowly decreased second average power can be understood as the peak value of the AC gradually decreases, but the waveform still roughly conforms to the sinusoidal wave to maintain the power factor.

Figure 5:
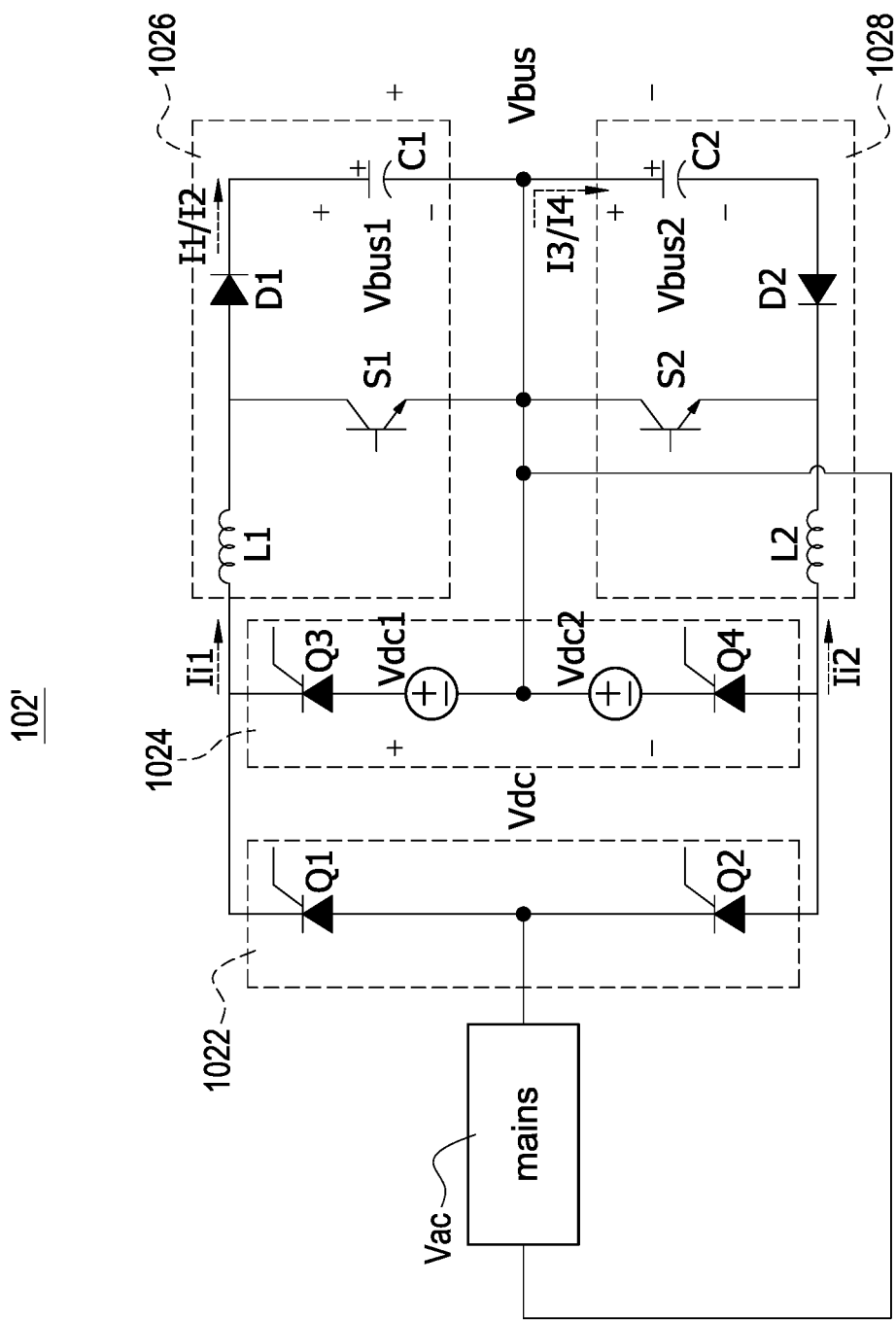
FIG. 5 is a schematic circuit block diagram according to a second embodiment of the conversion module of the present disclosure.

As shown in FIG. 4B, the control circuit of the DC-to-DC conversion unit 102-1 and the control circuit of the AC-to-DC conversion unit 102-2 may be collectively referred to as the control unit 20. Please refer to FIG. 5, which shows a schematic circuit block diagram according to a second embodiment of the conversion module of the present disclosure, and also refer to FIG. 1 to FIG. 4B. The difference between the embodiment and the embodiment shown in FIG. 4A is that the conversion module 102' of the former includes a first switching bridge arm 1022, a second switching bridge arm 1024, a first step-up unit 1026, and a second step-up unit 1028. The first switching bridge arm 1022 includes a first switch Q1 and a second switch Q2 connected in series to the first switch Q1, and the mains is coupled to a common-connected end of the first switch Q1 and the second switch Q2. The DC power source Vdc includes a first DC power source Vdc1 and a second DC power source Vdc2 connected in series to the first DC power source Vdc1 at a middle end. The second switching bridge arm 1024 includes a third switch Q3 and a fourth switch Q4 connected in series to the third switch Q3, and one end of the third switch Q3 is coupled to the other end of the first DC power source Vdc1, one end of the fourth switch Q4 is coupled to the other end of the second DC power source Vdc2. The first switching bridge arm 1022 is coupled in parallel to the second switching bridge arm 1024 so that the other end of the first switch Q1 is coupled to the other end of the third switch Q3, and the other end of the second switch Q2 is coupled to the other end of the fourth switch Q4.

The first step-up unit 1026 includes a first inductor L1, a first power switch S1, a first diode D1, and a first capacitor C1. One end of the first inductor L1 is coupled to the other end of the third switch Q3, and the other end of the first inductor L1 is coupled to the first power switch S1 and one end of the first diode D1. The other end of the first diode D1 is coupled to one end of the first capacitor C1. The other end of the first power switch S1, the other end of the first capacitor C1, and the mains Vac are coupled to a middle end of the DC power source Vdc. The second step-up unit 1028 includes a second inductor L2, a second power switch S2, a second diode D2, and a second capacitor C2. One end of the second inductor L2 is coupled to the other end of the fourth switch Q4, and the other end of the second inductor L2 is coupled to the second power switch S2 and one end of the second diode D2. The other end of the second diode D2 is coupled to one end of the second capacitor C2. The other end of the second power switch S2 and the other end of the second capacitor C2 are coupled to the middle end of the DC power source Vdc. In one embodiment, the first switch Q1 to the fourth switch Q4 are, for example but not limited to, silicon diodes. In other words, as long as switching elements available for switching should be included in the scope of this embodiment.

Specifically, the features of the conversion module 102' is that the mains Vac and the DC power source Vdc are both utilized by the conversion module 102'. When the first step-up unit 1026 converters one half wave of an AC power source, the second step-up unit 1028 simultaneously converts a DC power source. When the mains Vac is in the positive half cycle, the control unit 20 controls the first switching bridge arm 1022 to switch on the first switch Q1 so that the positive half cycle of the mains Vac is provided to the first step-up unit 1026 through the first switch Q1. The control unit 20 controls to switch the first power switch S1 so that the first inductor L1 stores energy or releases energy to generate the second current I2. Also, the second current I2 charges the first capacitor C1 to build a first bus voltage Vbus1 on the first capacitor C1. In the same half cycle, the control unit 20 controls the second switching bridge arm 1024 to switch on the fourth switch Q4 so that the DC power source Vdc is provided to the second step-up unit 1028 through the fourth switch Q4. The control unit 20 controls to switch the second power switch S2 so that the second inductor L2 stores energy or releases energy to generate the fourth current I4. Also, the fourth current I4 charges the second capacitor C2 to build a second bus voltage Vbus2 on the second capacitor C2. The sum of the first bus voltage Vbus1 and the second bus voltage Vbus2 is equal to the bus voltage Vbus. When the mains Vac is in the negative half cycle, the first bus voltage Vbus1 is built by the first current I1 and the second bus voltage Vbus2 is built by the third current I3 that is just contrary to the above-mentioned positive half cycle, and the detail description is omitted here for conciseness.

Since the second current I2 is generated by the first step-up unit 1026 according to the mains Vac in one half cycle and the first current I1 is generated according to the DC power source Vdc in the other half cycle, the first average power and the first bus voltage Vbus1 are varied if the first current I1 is varied. When the first bus voltage Vbus1 is varied, the control unit 20 would adjust the second current I2 in the next half cycle so that the second average power is varied as the variation of the second current I2. The operation of the second step-up unit 1028 is similar to that of the first step-up unit 1026, and the detail description is omitted here for conciseness.

When the control unit 20 wants to increase the load ratio supplied by the DC power source Vdc (for example but not limited from 0% to 50%), the control unit 20 slowly increases the first current I1 provided from the first step-up unit 1026 in the negative half cycle according to the power command Cp so that the first average power is correspondingly increased and the first bus voltage Vbus1 is varied as the variation of the first current I1. When the first bus voltage Vbus1 is varied, the control unit 20 would adjust the first step-up unit 1026 to maintain the first bus voltage Vbus1 to be a predetermined output voltage so as to the second current I2 outputted from the first step-up unit 1026 in the positive half cycle of the mains Vac. Therefore, when the first current I1 is slowly increased, the control unit 20 adjusts the second duty cycle according to the variation of the first bus voltage Vbus1 so that the second current I2 is slowly decreased, and therefore the second average power is correspondingly slowly decreased and the load ratio supplied by the mains Vac (for example but not limited from 100% to 50%). The operation of the second step-up unit 1028 is similar to that of the first step-up unit 1026 and the operation of decreasing the load ratio supplied by the DC power source Vdc that is just contrary to the above-mentioned increase operation, and the detail description is omitted here for conciseness.

Figure 6:
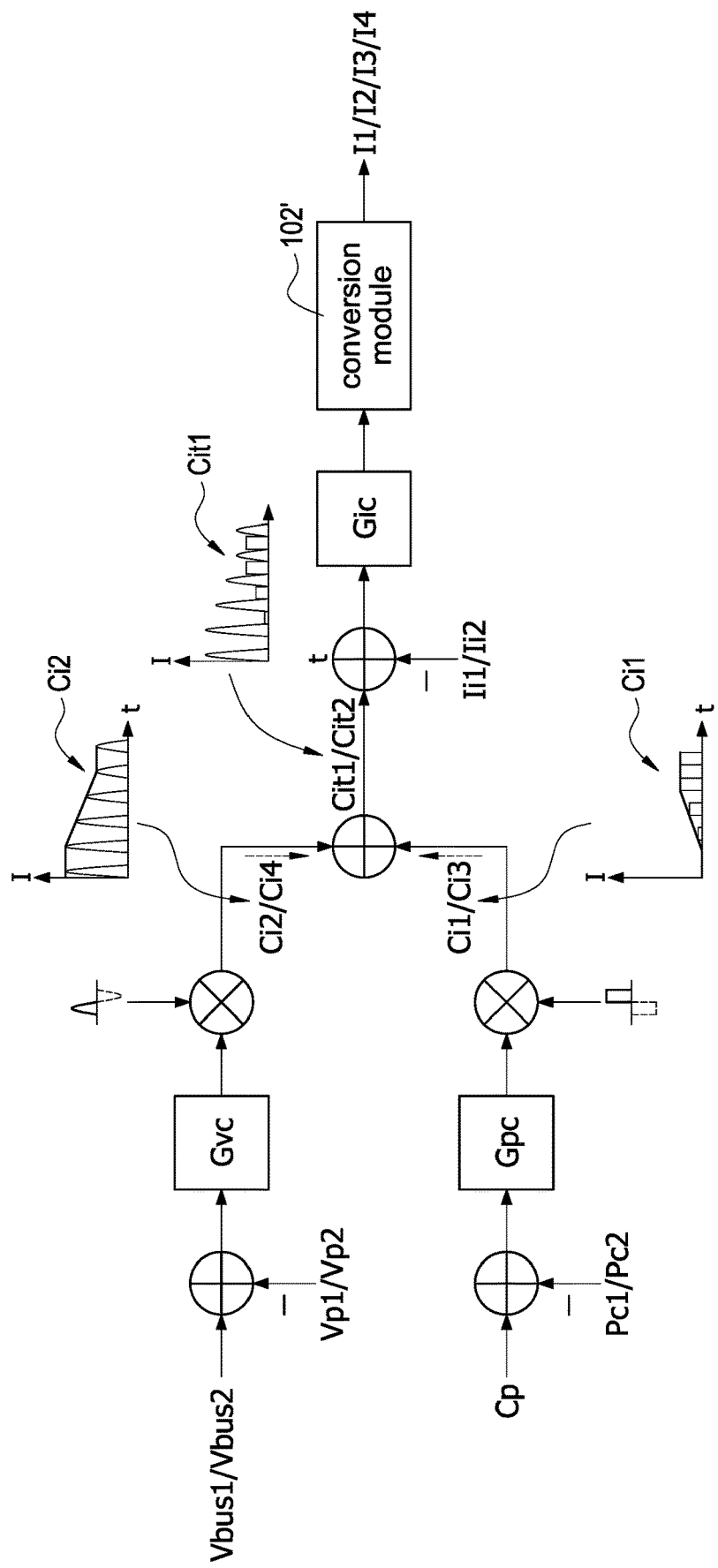
FIG. 6 is a schematic control block diagram according to the second embodiment of the conversion module of the present disclosure.

Please refer to FIG. 6, which shows a schematic control block diagram according to the second embodiment of the conversion module of the present disclosure, and also refer to FIG. 1 to FIG. 5. The conversion module 102' mainly includes two separate control blocks: one is a control block of the first step-up unit 1026, and the other is a control block of the second step-up unit 1028. In which, the manners are identical but the signals are different. For convenience, two control blocks are combined to represent. As shown in FIG. 6, the control unit 20 acquires a power difference value by a subtraction operation between the power command Cp and a first power value Pc1 of the first step-up unit 1026 in the negative half cycle. Similarly, a second power value Pc2 is corresponding to the second step-up unit 1028. The first power difference value is multiplied with a square wave to acquire the (DC) first current command Ci1. A first voltage difference value is acquired by a subtraction operation between the first bus voltage Vbus1 and a first predetermined output voltage Vp1 of the first step-up unit 1026. Similarly, a second predetermined output voltage Vp2 is corresponding to the second step-up unit 1028. The first voltage difference value is multiplied with a sinusoidal wave to acquire the (AC) second current command Ci2.

As shown in FIG. 6, the control unit 20 composes the first current command Ci1 and the second current command Ci2 into a first total current command Cit1. Further, the control unit 20 composes a third current command Ci3 and a fourth current command Ci4 into a second total current command Cit2. The second current command Ci2 is an AC positive sinusoidal-wave current command (indicated as the solid line) corresponding to the mains Vac in the positive half cycle. The first current command Ci1 is a DC positive square-wave current command (indicated as the solid line) corresponding to the DC power source Vdc in the negative half cycle. This schematic control shows that the first total current command Cit1 with the positive sinusoidal wave and the positive square wave spaced with intervals, that is, the input current of the first step-up unit 1026 would follow the first total current command Cit1. A first total current difference value is acquired by a subtraction operation between the first total current command Cit1 and a first input current Ii1 of the first step-up unit 1026, and the first total current difference value is multiplied by a control parameter Gic to acquire a first control amount. The control unit 20 adjusts the first duty cycle of the first step-up unit 1026 in the negative half cycle of the mains Vac according to the first control amount to adjust the first current I1 provided from the DC power source Vdc, and adjusts the second duty cycle of the first step-up unit 1026 in the positive half cycle of the mains Vac according to the first control amount to adjust the second current I2 provided from the mains Vac.

It is similar to the control block operation of the second step-up unit 1028. As shown in the sinusoidal wave and the square wave are indicated by dashed lines in FIG. 6, and the detail description is omitted here for conciseness. In one embodiment, the first step-up unit 1026 and the second step-up unit 1028 have a function of the power factor correction so that the first input current Ii1 and a second input current Ii2 follow the mains Vac to make the second current command Ci2 produced by multiplying the first voltage difference value by the sinusoidal wave become the AC current command waveform.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power conversion system configured to supply power to a load, the power conversion system comprising:
   an uninterruptible power apparatus comprising:
   a conversion module coupled to a mains and a DC power source, and configured to convert the mains and the DC power source into a bus voltage, and
   a DC-to-AC conversion unit coupled to the conversion module, and configured to convert the bus voltage to supply power to the load,
   a generator module coupled to the DC power source, and
   a control unit coupled to the conversion module,
   wherein the conversion module comprises:
   an AC-to-DC conversion unit coupled to the mains and the DC-to-AC conversion unit, and
   a DC-to-DC conversion unit coupled to the DC power source and the DC-to-AC conversion unit,
   wherein the control unit is configured to control the conversion module to adjust a first average power provided from the DC power source according to a power command so that the first average power is slowly increased or decreased to affect the bus voltage, and the control unit is configured to control the conversion module according to the bus voltage so that a second average power provided from the mains is slowly decreased or increased corresponding to the first average power, and
   wherein the control unit is configured to adjust a first duty cycle of the DC-to-DC conversion unit according to the power command so that a first current corresponding to the first average power provided from the DC-to-DC conversion unit is slowly increased or decreased, and the control unit is configured to adjust a second duty cycle of the AC-to-DC conversion unit according to the bus voltage so that a second current corresponding to the second average power provided from the AC-to-DC conversion unit is slowly decreased or increased.

2. The power conversion system in claim 1, wherein the control unit is configured to acquire a power difference value according to the power command and a power value of the DC-to-DC conversion unit, and calculate a first current command according to the power difference value; the control unit is configured to produce a first control amount according to the first current command and a first current difference value of the first current, and adjust the first duty cycle according to the first control amount.

3. The power conversion system in claim 1, wherein the control unit is configured to calculate a second current command according to the bus voltage and a predetermined output voltage of the AC-to-DC conversion unit; the control unit is configured to produce a second control amount according to the second current command and an input current of the AC-to-DC conversion unit, and adjust the second duty cycle according to the second control amount.

4. A power conversion system configured to supply power to a load, the power conversion system comprising:
an uninterruptible power apparatus comprising:
a conversion module coupled to a mains and a DC power source, and configured to convert the mains and the DC power source into a bus voltage, and
a DC-to-AC conversion unit coupled to the conversion module, and configured to convert the bus voltage to supply power to the load,
a generator module coupled to the DC power source, and
a control unit coupled to the conversion module,
wherein the conversion module comprises:
a first switching bridge arm comprising a first end, a second end, and a power source end, wherein the power source end is coupled to the mains,
a second switching bridge arm comprising a first end, a second end, and a power source end, wherein the first end is coupled to the first end of the first switching bridge arm, the second end is coupled to the second end of the first switching bridge arm, and the power source end is coupled to the DC power source,
a first step-up unit comprising a power source end and a middle end, wherein the power source end is coupled to the first end of the second switching bridge arm, and the middle end is coupled to the mains and the DC power source, and
a second step-up unit comprising a power source end and a middle end, wherein the power source end is coupled to the second end of the second switching bridge arm, and the middle end is coupled to the mains and the DC power source,
wherein the control unit is configured to control the conversion module to adjust a first average power provided from the DC power source according to a power command so that the first average power is slowly increased or decreased to affect the bus voltage, and the control unit is configured to control the conversion module according to the bus voltage so that a second average power provided from the mains is slowly decreased or increased corresponding to the first average power.

5. The power conversion system in claim 4, wherein when the mains is in a positive half cycle, the control unit is configured to control switching the first switching bridge arm to provide the mains to the first step-up unit so that the first step-up unit is configured to generate a first bus voltage, and the control unit is configured to control switching the second switching bridge arm to provide the DC power source to the second step-up unit so that the second step-up is configured to generate a second bus voltage, and
when the mains is in a negative half cycle, the control unit is configured to control switching the first switching bridge arm to provide the mains to the second step-up unit so that the second step-up unit is configured to generate the second bus voltage, and the control unit is configured to control switching the second switching bridge arm to provide the DC power source to the first step-up unit so that the first step-up is configured to generate the first bus voltage; the bus voltage is equal to a sum of the first bus voltage and the second bus voltage.

6. The power conversion system in claim 5, wherein the control unit is configured to adjust a first duty cycle of the first step-up unit in the negative half cycle according to the power command so that a first current corresponding to the first average power is slowly increased or decreased, and the control unit is configured to adjust a second duty cycle of the first step-up unit in the positive half cycle according to the first bus voltage so that a second current corresponding to the second average power is slowly decreased or increased corresponding to the first current, and
the control unit is configured to adjust a third duty cycle of the second step-up unit in the positive half cycle according to the power command so that a third current corresponding to the first average power is slowly increased or decreased, and the control unit is configured to adjust a fourth duty cycle of the second step-up unit in the negative half cycle according to the second bus voltage so that a fourth current corresponding to the second average power is slowly decreased or increased corresponding to the third current.

7. The power conversion system in claim 6, wherein the control unit is configured to calculate a first current command according to the power command, and the control unit is configured to calculate a second current command according to the first bus voltage and a first predetermined output voltage of the first step-up unit; the control unit is configured to compose the first current command and the second current command into a first total current command, the control unit is configured to produce a first control amount according to the first total current command and an input current of the first step-up unit, and adjust the first duty cycle and the second duty cycle according to the first control amount.

8. The power conversion system in claim 1, further comprising:
a renewable energy module coupled to the conversion module and the control unit, and
an energy storage module coupled to the conversion module and the control unit,
wherein the control unit is configured to selectively control the generator module, the renewable energy module, or the energy storage module according to a demand power of the load to provide the DC power source to the conversion module.

9. The power conversion system in claim 8, wherein when the demand power is greater than or equal to a predetermined power, the control unit is configured to control the mains and the DC power source jointly supply power to the load according to the power command.

10. The power conversion system in claim 8, wherein when the demand power is less than a predetermined power, the control unit is configured to control the mains to supply power to the load and charge the energy storage module.

11. The power conversion system in claim 8, wherein the conversion module is a bi-directional conversion module;

when the renewable energy module is configured to supply power to the load and a redundant power is available, the control unit is configured to control the redundant power to be converted into the mains through the bi-directional conversion module.

12. A method of operating a power conversion system, comprising the steps of:
controlling a conversion module to convert a mains and a DC power source into a bus voltage,
controlling a DC-to-AC conversion unit to convert the bus voltage to supply power to a load,
controlling a generator module to provide electricity energy to the DC power source,
controlling a first average power provided from the DC power source to slowly increase or decrease according to a power command to affect the bus voltage, and
controlling a second average power provided from the mains to slowly decrease or increase corresponding to the first average power according to the bus voltage,
wherein the conversion module comprises an AC-to-DC conversion unit and a DC-to-DC conversion unit, the method further comprises the steps of:
adjusting a first duty cycle of the DC-to-DC conversion unit according to the power command so that a first current corresponding to the first average power is slowly increased or decreased, and
adjusting a second duty cycle of the AC-to-DC conversion unit according to the bus voltage so that a second current corresponding to the second average power is slowly decreased or increased corresponding to the bus voltage.

13. The method of operating the power conversion system in claim 12, further comprising the steps of:
acquiring a power difference value according to the power command and a power value of the DC-to-DC conversion unit, and calculating a first current command according to the power difference value,
producing a first control amount according to the first current command and the first current, and adjusting the first duty cycle according to the first control amount, and
calculating a second current command according to the bus voltage and a predetermined output voltage of the AC-to-DC conversion unit, producing a second control amount according to the second current command and an input current of the AC-to-DC conversion unit, and adjusting the second duty cycle according to the second control amount.

14. A method of operating a power conversion system, comprising the steps of:
controlling a conversion module to convert a mains and a DC power source into a bus voltage,
controlling a DC-to-AC conversion unit to convert the bus voltage to supply power to a load,
controlling a generator module to provide electricity energy to the DC power source,
controlling a first average power provided from the DC power source to slowly increase or decrease according to a power command to affect the bus voltage, and
controlling a second average power provided from the mains to slowly decrease or increase corresponding to the first average power according to the bus voltage,
wherein the conversion module comprises a first step-up unit and a second step-up unit, the method further comprises the steps of:
providing the mains to the first step-up unit when the mains is in a positive half cycle to generate a first bus voltage from the first step-up unit, and providing the DC power source to the second step-up unit to generate a second bus voltage from the second step-up unit, and
providing the mains to the second step-up unit when the mains is in a negative half cycle to generate the second bus voltage from the second step-up unit, and providing the DC power source to the first step-up unit to generate the first bus voltage from the first step-up unit, wherein the bus voltage is equal to a sum of the first bus voltage and the second bus voltage.

15. The method of operating the power conversion system in claim 14, further comprising the steps of:
adjusting a first duty cycle of the first step-up unit in the negative half cycle according to the power command to slowly increase or decrease a first current corresponding to the first average power,
adjusting a second duty cycle of the first step-up unit in the positive half cycle according to the first bus voltage to slowly decrease or increase a second current corresponding to the second average power,
adjusting a third duty cycle of the second step-up unit in the positive half cycle according to the power command to slowly increase or decrease a third current corresponding to the first average power, and
adjusting a fourth duty cycle of the second step-up unit in the negative half cycle according to the second bus voltage to slowly decrease or increase a fourth current corresponding to the second average power.

16. The method of operating the power conversion system in claim 15, further comprising the steps of:
calculating a first current command according to the power command,
calculating a second current command according to the first bus voltage and a first predetermined output voltage of the first step-up unit, and
composing the first current command and the second current command into a first total current command, producing a first control amount according to the first total current command and a first input current of the first step-up unit, and adjusting the first duty cycle and the second duty cycle according to the first control amount.

17. The power conversion system in claim 4, further comprising:
a renewable energy module coupled to the conversion module and the control unit, and
an energy storage module coupled to the conversion module and the control unit,
wherein the control unit is configured to selectively control the generator module, the renewable energy module, or the energy storage module according to a demand power of the load to provide the DC power source to the conversion module.

18. The power conversion system in claim 17, wherein when the demand power is greater than or equal to a predetermined power, the control unit is configured to control the mains and the DC power source jointly supply power to the load according to the power command.

19. The power conversion system in claim 17, wherein when the demand power is less than a predetermined power, the control unit is configured to control the mains to supply power to the load and charge the energy storage module.

20. The power conversion system in claim 17, wherein the conversion module is a bi-directional conversion module; when the renewable energy module is configured to supply power to the load and a redundant power is available, the control unit is configured to control the redundant power to be converted into the mains through the bi-directional conversion module.

\* \* \* \* \*